US008265205B2

(12) United States Patent  
Pedersen et al.

(10) Patent No.: US 8,265,205 B2  
(45) Date of Patent: Sep. 11, 2012

(54) RECEIVER ARCHITECTURE

(75) Inventors: Carsten Aagaard Pedersen, Belmont, MA (US); Navid Fatemi-Ghomi, Surrey (GB); Aiguo Yan, Andover, MA (US); Jason Taylor, Surrey (GB)

(73) Assignee: MediaTek Inc., Hsin-Chu (TW)

( * ) Notice: Subject to any disclaimer, the term of this patent is extended or adjusted under 35 U.S.C. 154(b) by 721 days.

(21) Appl. No.: 12/198,669

(22) Filed: Aug. 26, 2008

(65) Prior Publication Data

US 2009/0304121 A1   Dec. 10, 2009

Related U.S. Application Data

(60) Provisional application No. 61/058,905, filed on Jun. 4, 2008.

(51) Int. Cl.
*H04L 27/06* (2006.01)
*H03M 13/41* (2006.01)

(52) U.S. Cl. ........................................ 375/341; 714/795

(58) Field of Classification Search ................. 375/262, 375/265, 340, 341; 714/794, 795
See application file for complete search history.

(56) References Cited

U.S. PATENT DOCUMENTS

| 2002/0141437 A1 | 10/2002 | Meyer et al. | |
|---|---|---|---|
| 2006/0067395 A1* | 3/2006 | Hafeez | 375/232 |
| 2007/0195904 A1* | 8/2007 | Kemenczy et al. | 375/262 |
| 2007/0237268 A1* | 10/2007 | Wu et al. | 375/343 |
| 2007/0263744 A1* | 11/2007 | Mostafa | 375/267 |
| 2008/0159452 A1 | 7/2008 | Kelley | |
| 2010/0016012 A1* | 1/2010 | Valadon | 455/550.1 |

OTHER PUBLICATIONS

A. Hafeez, D. Hui, H. Arslan, "Interference Cancellation for EDGE via Two-User Joint Demodulation", 2003 IEEE Vehicular Technology Conference, vol. 2, Oct. 2003.

H. Schoeneich, P. Hoeher, "Single Antenna Interference Cancellation: Iterative Semi-Blind Algorithm and Performance Bound for Joint Maximum-Likelihood Interference Cancellation", 2003 IEEE Global Telecommunications Conference, Globecom '03, vol. 3, Dec 2003.

M. Pukkila, G. P. Mattellini, P. A. Ranta, "Cochannel Interference Suppression for Constant Modulus Signals", 2004 IEEE International Conference on Communications, vol. 5, Jun. 2004.

Zhang Hao, et al. "An Implementation of Viterbi Decoder Based on CSI Soft Output in OFDM Systems," School of Electronic and Information Engineering, South China Univ. of Technology, Guangzhou 510640, China; Journal of Guilin University of Electronic Technology, vol. 25, No. 2, Apr. 2005, 5 pages.

* cited by examiner

*Primary Examiner* — Young T. Tse
(74) *Attorney, Agent, or Firm* — Fish & Richardson P.C.

(57) ABSTRACT

A wireless receiver uses a joint detection Viterbi (JDV) algorithm to demodulate a signal that has a desired signal component and an interference signal component. The desired signal component includes a training sequence and at least one data field. The training sequence and a corresponding portion of the interference signal component is demodulated using the JDV algorithm to evaluate possible transmitted training sequences and interference signal sequences, and channel estimations for the desired signal component and the interference signal component are generated. The at least one data field is demodulated according to the JDV algorithm using the channel estimations as initial channel estimates for the JDV algorithm.

37 Claims, 10 Drawing Sheets

RECEIVER ARCHITECTURE

RELATED APPLICATIONS

This application claims priority to U.S. Patent Application No. 61/058,905, titled "RECEIVER ARCHITECTURE", filed on Jun. 4, 2008. This application is related to U.S. patent application Ser. No. 12/198,702 titled "RECEIVER ARCHITECTURE", filed concurrently with this application. The above applications are incorporated herein by reference.

BACKGROUND

This description relates to a receiver architecture.

When multiple cell phones are used within a network, the signals associated with different cell phones may interfere with one another, resulting in degradation of receive signal quality or even dropped calls. In some examples, a joint demodulation Viterbi (JDV) algorithm can be used to demodulate (or decode) the wanted signal and the interference signal jointly, resulting in reduced interference and better receive signal quality.

SUMMARY

In general, in one aspect, a signal that includes a desired signal component and an interference signal component is received, the desired signal component including a training sequence and at least one data field; the training sequence and a corresponding portion of the interference signal component is demodulated using a joint detection Viterbi (JDV) algorithm to evaluate possible transmitted training sequences and interference signal sequences, and channel estimations for the desired signal component and the interference signal component are generated; and the at least one data field is demodulated according to the JDV algorithm using the channel estimations as initial channel estimates for the JDV algorithm.

Implementations may include one or more of the following features. Demodulating the training sequence and the corresponding portion of the interference signal component includes eliminating possible transmitted training sequences that are inconsistent with a known transmitted training sequence. The desired signal component complies with Global System for Mobile Communications (GSM) standard. The interference signal includes a co-channel interference signal. Demodulating the training sequence and a corresponding portion of the interference signal component using the JDV algorithm includes iterating the JDV algorithm over the training sequence two or more times. Demodulating the training sequence and a corresponding portion of the interference signal component using the JDV algorithm includes calculating branch metrics using information about a known transmitted training sequence. Demodulating the at least one data field according to the JDV algorithm includes calculating branch metrics using information about estimated transmitted data symbols. The wireless signal includes a first data field followed by the training sequence followed by a second data field. Demodulating the training sequence includes applying the JDV algorithm to a first portion of the training sequence to obtain a first channel estimation for the desired signal component and the interference signal component, and applying the JDV algorithm to a second portion of the training sequence to obtain a second channel estimation for the desired signal component and the interference signal component. The JDV algorithm is applied to demodulate the first data field using the first channel estimation as an initial channel estimate, and the JDV algorithm is applied to demodulate the second data field using the second channel estimation as an initial channel estimate. Initial channel estimates are generated for the desired signal based on cross correlation of the received signal and a known training sequence, in which the initial channel estimates for the desired signal are used by the JDV algorithm for demodulating the training sequence and a corresponding portion of the interference signal component.

In general, in another aspect, a joint detection Viterbi (JDV) algorithm is applied to demodulate a training sequence of an input signal to obtain information about channel characteristics of a desired signal component and an interference signal component of the input signal; and the JDV algorithm is applied to demodulate at least one data field of the input signal using initial channel estimates that are based on information about channel characteristics of the desired signal component and the interference signal component obtained when demodulating the training sequence.

Implementations may include one or more of the following features. The input signal complies with Global System for Mobile Communications (GSM) standard. Applying the JDV algorithm includes evaluating various possible transmitted sequences to find a possible transmitted sequence that best matches a received signal. Applying the JDV algorithm to demodulate the training sequence includes evaluating various possible transmitted training sequences and interference signal sequences based on accumulated path metrics, and selecting one or more possible transmitted sequences that are consistent with a known transmitted training sequence. Applying the JDV algorithm to demodulate the training sequence includes calculating branch metrics using a known transmitted training sequence. Applying the JDV algorithm to demodulate the at least one data field includes calculating branch metrics using estimated transmitted data symbols. Applying the JDV algorithm to demodulate the training sequence includes iteratively applying the JDV algorithm to the training sequence two or more times. The input signal includes a first data field followed by the training sequence followed by a second data field. Applying the JDV algorithm to demodulate the training sequence includes applying the JDV algorithm to a first portion of the training sequence to obtain a first channel estimation for the desired signal component and the interference signal component, and applying the JDV algorithm to a second portion of the training sequence to obtain a second channel estimation for the desired signal component and the interference signal component. The JDV algorithm is applied to demodulate the first data field using the first channel estimation as an initial channel estimate, and the JDV algorithm is applied to demodulate the second data field using the second channel estimation as an initial channel estimate.

In general, in another aspect, a signal that includes a desired signal component and an interference signal component is received, the desired signal component including a training sequence, a first data field, and a second data field. A joint detection Viterbi (JDV) algorithm is iteratively applied to a first portion of the training sequence to generate first channel estimations for the desired signal component and the interference signal component; and the JDV algorithm is iteratively applied to a second portion of the training sequence to generate second channel estimations for the desired signal component and the interference signal component. The first data field is demodulated according to the JDV algorithm using the first channel estimations as initial channel estimates for the JDV algorithm; and the second data field is demodulated according to the JDV algorithm using the second channel estimations as initial channel estimates for the JDV algorithm.

Implementations may include one or more of the following features. The input signal complies with Global System for Mobile Communications (GSM) standard. Applying the JDV algorithm to a first portion of the training sequence includes evaluating various possible transmitted training sequences and interference signal sequences based on accumulated path metrics, and selecting one or more possible transmitted sequences that are consistent with a known portion of transmitted training sequence.

In general, in another aspect, a wireless receiver includes a joint detection Viterbi (JDV) demodulator to apply a JDV algorithm to a training sequence of a burst signal to demodulate the training sequence and determine channel estimations for a desired signal and an interference signal, and apply the JDV algorithm to at least one data field of the burst signal to demodulate a data sequence in the at least one data field using the channel estimations as initial channel estimates for the JDV algorithm.

Implementations may include one or more of the following features. The wireless receiver includes a channel impulse response estimator to provide initial channel estimates for the desired signal when applying the JDV algorithm to the training sequence. The burst signal includes a GSM (Global System for Mobile Communications) burst signal. The JDV demodulator builds a tree or trellis data structure to evaluate possible transmitted training sequences and selects possible transmitted training sequences that are consistent with a known transmitted training sequence. The JDV demodulator calculates branch metrics using information about the known transmitted training sequence when demodulating the training sequence. The JDV demodulator calculates branch metrics using information about estimated transmitted data symbols when demodulating the data sequence. The demodulator iterates the JDV algorithm over the training sequence two or more times. The demodulator iterates the JDV algorithm over each of the at least one data field not more than once. The burst signal includes a first data field followed by the training sequence followed by a second data field. The JDV demodulator applies the JDV algorithm to a first portion of the training sequence to obtain a first channel estimation for the desired signal component and the interference signal component, and applies the JDV algorithm to a second portion of the training sequence to obtain a second channel estimation for the desired signal component and the interference signal component. The JDV demodulator applies the JDV algorithm to demodulate the first data field using the first channel estimation as an initial channel estimate, and applies the JDV algorithm to demodulate the second data field using the second channel estimation as an initial channel estimate.

In general, in another aspect, an input module receives an input signal that includes a desired signal component and an interference signal component, the desired signal component including a training sequence and at least one data field. A joint detection Viterbi (JDV) demodulator demodulates the training sequence and a corresponding portion of the interference signal component using a joint detection Viterbi (JDV) algorithm to evaluate possible transmitted training sequences and interference signal sequences, and determines channel estimations for the desired signal component and the interference signal component, and demodulates the at least one data field according to the JDV algorithm using, as initial channel estimates, the channel estimations of the desired signal component and the interference signal component obtained when demodulating the training sequence.

Implementations may include one or more of the following features. The input signal complies with Global System for Mobile Communications (GSM) standard.

In general, in another aspect, a receiver adaptively selects between a joint detection Viterbi demodulator and a second Viterbi demodulator to demodulate a received signal based on at least one characteristic of the received signal. The joint detection Viterbi demodulator jointly demodulates a desired signal component and an interference signal component of the received signal, and the second Viterbi demodulator demodulates the desired signal component without demodulating the interference signal component.

Implementations may include one or more of the following features. The characteristic of the received signal includes at least one of a received signal strength indicator (RSSI), a filter selection in an interference cancellation unit, a propagation channel length associated with the received signal, and a magnitude of a linear prediction coefficient of an interference signal component of the received signal. The receiver includes a pre-processing unit to estimate a received signal strength indicator (RSSI) of the received signal, and the receiver selects the joint demodulation Viterbi demodulator if the RSSI is greater than a threshold value. The receiver includes an interference cancellation unit that applies at least two candidate filters to the modulated signal and selects one of the candidate filters to minimize an error metric. The at least two candidate filters include at least one of an additive white Gaussian noise (AWGN) filter, a co-channel interference (CCI) filter, and an adjacent channel interference (ACI) filter. The receiver includes a long channel detection unit to determine a propagation channel length associated with the desired signal, and the receiver selects the second Viterbi demodulator if the propagation channel length is greater than a threshold. The receiver includes a spectral analysis unit to determine a first order linear prediction coefficient of the interference signal, and the receiver selects the joint detection Viterbi demodulator if the first order linear prediction coefficient is higher than a threshold. The desired signal complies with Global System for Mobile Communications (GSM) standard.

In general, in another aspect, a receiver includes an input unit to receive an input signal having modulated components, a first demodulator to demodulate the modulated components of the input signal according to a first process, a second demodulator to demodulate the modulated components of the input signal according to a second process, a decision unit to automatically select one of the first and second demodulators to demodulate the input signal based on one or more characteristics of the input signal, and a channel decoder to decode a demodulated signal generated by the selected first or second demodulator.

Implementations may include one or more of the following features. The first demodulator jointly demodulates a desired signal component and an interference signal component of the input signal. The first demodulator includes a joint detection Viterbi demodulator. The second demodulator demodulates the desired signal component without demodulating the interference signal component. The second demodulator includes a standard Viterbi demodulator. The characteristics of the input signal includes at least one of a received signal strength indicator (RSSI) of the input signal, a filter selection in an interference cancellation unit, a propagation channel length associated with the input signal, and a magnitude of a linear prediction coefficient of an interference signal component of the input signal. The input signal is modulated according to Global System for Mobile Communications (GSM) standard.

In general, in another aspect, an input signal is received, and one of a joint detection Viterbi demodulator and a second Viterbi demodulator is adaptively selected to demodulate the input signal based on at least one characteristic of the input signal. Upon selecting the joint detection Viterbi demodulator, a desired signal component and an interference signal component of the input signal are jointly demodulated; and upon selecting the second Viterbi demodulator, the desired signal component is demodulated without demodulating the interference signal component of the input signal.

Implementations may include one or more of the following features. The at least one characteristic of the input signal includes at least one of a received signal strength indicator (RSSI) of the input signal, a filter selection in an interference cancellation unit, a propagation channel length associated with the input signal, and a magnitude of a linear prediction coefficient of the interference signal component of the input signal. The input signal is pre-processed to estimate a received signal strength indicator (RSSI) of the input signal, in which the adaptively selecting includes selecting the joint detection Viterbi demodulator if the RSSI is greater than a threshold value. An interference cancellation unit applies at least two candidate filters to the input signal and selects one of the candidate filters to minimize an error metric. The at least two candidate filters include at least one of an additive white Gaussian noise (AWGN) filter, a co-channel interference (CCI) filter, and an adjacent channel interference (ACI) filter. A propagation channel length associated with the input signal is determined, in which the adaptively selecting includes selecting the second Viterbi demodulator if the propagation channel length is greater than a threshold. A first order linear prediction coefficient of an interference signal component of the input signal is determined, in which the adaptively selecting includes selecting the joint detection Viterbi demodulator if the magnitude of the first order linear prediction coefficient is higher than a threshold. The input signal complies with Global System for Mobile Communications (GSM) standard.

In general, in another aspect, a Global System for Mobile Communications (GSM) phone includes an antenna to receive an input signal that complies with GSM standard; an enhanced interference cancellation (EIC) filter module; a joint detection Viterbi (JDV) demodulator to jointly demodulate a desired signal component and an interference signal component of the input signal; a second Viterbi demodulator to demodulate the desired signal component without demodulating the interference signal component; and a decision device to adaptively select between the joint detection Viterbi demodulator and the second Viterbi demodulator to demodulate the input signal based on at least one of a received signal strength indicator (RSSI) of the input signal, a filter selection in the EIC module, a propagation channel length associated with the input signal, and the magnitude of a linear prediction coefficient of an interference signal component of the input signal.

In general, in another aspect, an apparatus includes an input module to receive an input signal; and means for adaptively selecting between a first Viterbi demodulator and a second Viterbi demodulator to demodulate the input signal based on at least one characteristic of the input signal. The first Viterbi demodulator jointly demodulates a desired signal component and an interference signal component of the input signal, and the second Viterbi demodulator demodulates the desired signal component without demodulating the interference signal component of the input signal.

These and other aspects and features, and combinations of them, may be expressed as methods, apparatus, systems, means for performing functions, program products, and in other ways.

Advantages of the aspects, systems, and methods may include one or more of the following. Wireless signals can be more accurately demodulated by adaptively selecting between a standard Viterbi demodulator and a joint detection Viterbi (JDV) demodulator based on characteristics of the wireless signals. Demodulation of user signals in the presence of interference signals can be performed faster by iterating the JDV algorithm over training sequences to obtain channel estimations for desired and interference signals, then iterating the JDV algorithm over data fields using the channel estimations as initial channel estimates. Splitting the training sequence analysis (e.g., analyzing a first half of the training sequence, then analyzing a second half of the training sequence) can improve the performance of the receiver for asynchronous interferers.

DETAILED DESCRIPTION

Acronyms

Below are acronyms used in this document.
JDV—Joint Detection Viterbi
SAIC—Single Antenna Interference Cancellation
GSM—Global System for Mobile communications
CIR—Channel Impulse Response
GMSK—Gaussian Minimum-Shift Keying
PSK—Phase-Shift Keying
AWGN—Additive White Gaussian Noise
TS—Training Sequence
APM—Accumulated Path Metric
ACS—Add-Compare-Select
SV—Soft Value
TB—Trace Back
LMS—Least Mean Squares
DARP—Downlink Advanced Receiver Performance
SAIC—Single Antenna Interference Cancellation
EIC—Enhanced Interference Cancellation
RSSI—Received Signal Strength Indicator
ACI—Adjacent Channel Interference
MSE—Mean Square Error
LCD—Long Channel Detection
LPC—Linear Prediction Coefficient
EGPRS—Enhanced General Packet Radio Service

OVERVIEW

In some implementations, a DARP receiver is designed to meet the requirements of 3GPP DARP Phase I requirements, which are aiming at reducing the adverse effect of interfering signals by a more intelligent receiver implementation, e.g., by use of Single Antenna Interference Cancellation (SAIC). There are several receiver concepts that address SAIC, and the one chosen for the DARP receiver is based on a Joint Demodulation Viterbi (JDV) algorithm in which the wanted or desired signal and the dominant interference signal are jointly demodulated.

In some examples, the complexity for implementing a JDV demodulator may exhibit exponential growth with the length of the propagation channel estimates for the wanted and interfering signals. In some examples, a software-based implementation of the JDV demodulator is limited to 3 taps for estimating wanted and interfering signals, and therefore the JDV demodulator may not be well suited for demodulation of channels that are dominated by long propagation channel dispersion (e.g. HT100 profiles). Also, in cases where there is no dominant interference (i.e., the reception is only limited by thermal noise induced in the RF circuitry), the JDV demodulator may not perform as well as a standard Viterbi demodulator.

In this document, the "standard Viterbi demodulator" refers to a demodulator that uses the Viterbi algorithm to demodulate the modulated desired signal without demodulating the modulated interference signal. The "JDV demodulator" refers to a demodulator that uses the Joint Detection Viterbi algorithm to jointly demodulate the modulated desired signal and the modulated interference signal. In the description below, when we say "demodulate the desired signal" we mean demodulate the modulated desired signal, and when we say "demodulate the interference signal" we mean demodulate the modulated interference signal.

In some implementations, the receiver defaults to the standard Viterbi demodulator when the JDV demodulator underperforms the standard Viterbi demodulator. This document describes how the receiver determines which demodulator to use and how general receiver tasks (e.g., timing estimation) are executed.

Receiver Architecture

Figure 1:
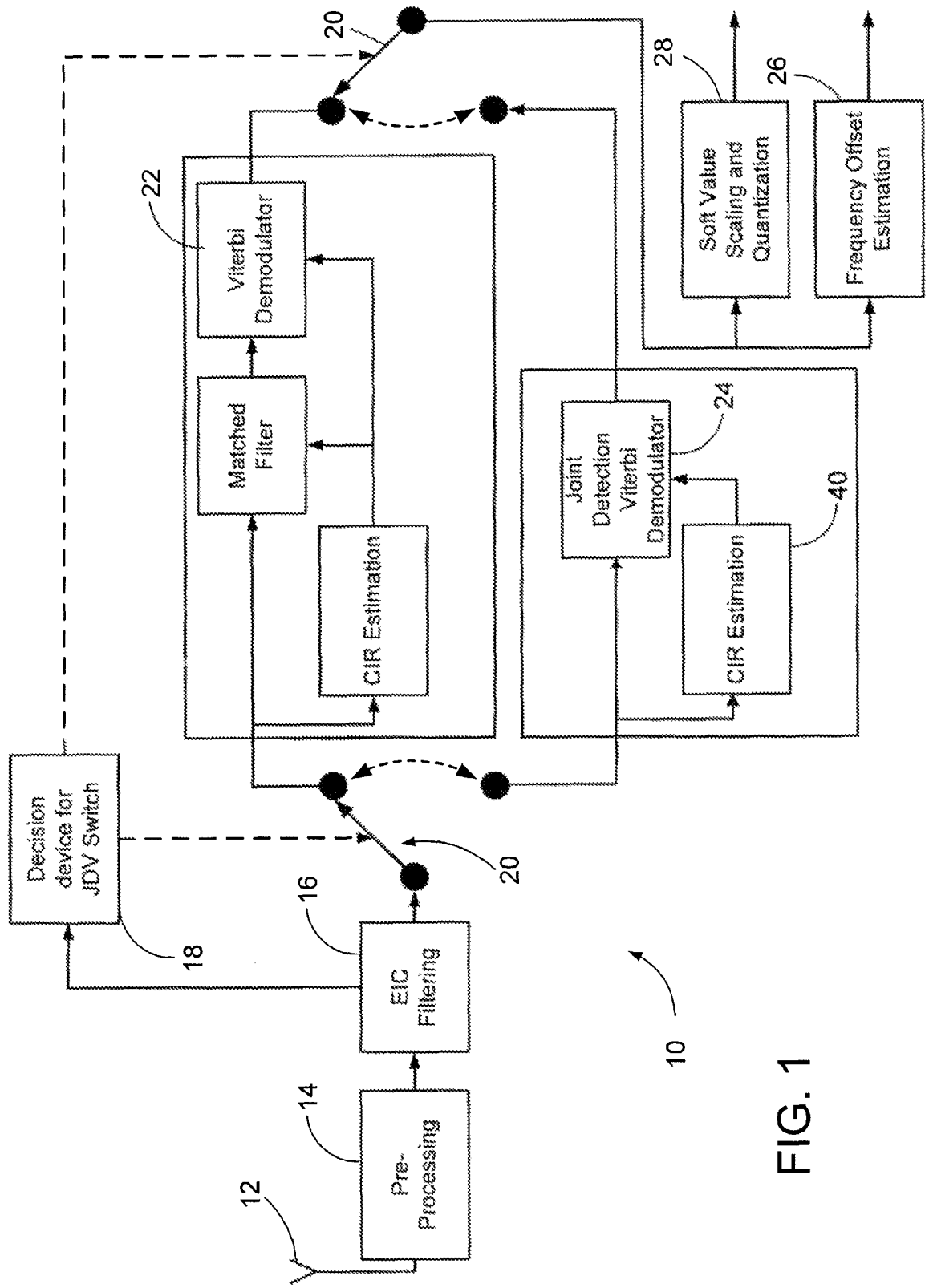
FIG. 1 shows a signal flow diagram of a receiver.

FIG. 1 shows a signal flow of a DARP receiver 10. A signal (e.g., modulated according to GSM standard) is received at an antenna 12. The received signal may include a desired signal component and a co-channel interference signal component. The received signal is processed by a pre-processing block 14 that performs, e.g., offset (DC) estimation and correction, frequency correction and timing offset estimation, and received signal strength indicator (RSSI) estimation. The next step is to analyze the received signal and apply the appropriate receive filter in the EIC block 16, including detection of long propagation channels. Based on, e.g., the RSSI and EIC decisions, a JDV decision device 18 controls a JDV switch 20 that chooses either a standard Viterbi demodulator 22 or a Joint Demodulation Viterbi demodulator 24.

For example, the standard Viterbi demodulator 22 demodulates the desired signal using the Viterbi algorithm, but does not demodulate the interference signal based on the Viterbi algorithm. By comparison, the JDV demodulator 24 demodulates both the desired signal and the interference signal based on the Viterbi algorithm. The standard Viterbi demodulator 22 may perform better under certain circumstances, while the joint detection Viterbi demodulator 24 may performs better under other circumstances. The criteria used by the JDV decision device 18 for determining which demodulator (22 or 24) to select will be described below.

The output of either demodulator 22 or 24 is used by a frequency offset estimation unit 26 for estimating the frequency offset. The output of the demodulator 22 or 24 is also passed through a scaling and quantization block 28 that generates soft values that are passed to a channel decoder.

Pre-Processing Block

The pre-processing block 14 performs several operations independently of subsequent selection of JDV or standard Viterbi decoder. Below are examples of the operations performed by the pre-processing block 14:
  RSSI Measurement
  DC offset estimation and correction
  Modulation detection for EGPRS (this description assumes GMSK modulation)
  Pre-scaling of IQ
  Frequency correction of known offset
  Initial CIR estimation for wanted signal The RSSI and CIR estimates can be used in the selection process for JDV. RSSI is defined as the power of the received signal, and is estimated by first estimating the mean power of the received data and then normalizing this based on the RF gain settings, so that the result is the received power in dBm (dB relative to 1 mW). The CIR is obtained from the cross correlation of the received signal and the known training sequence.

EIC Filtering

The following describes the EIC filtering block 16. The principle of EIC filtering block 16 is to select, from a set of predefined candidate filters, the filter that minimizes the squared error between the filter output and the training sequence passed through a modified propagation channel model. This brute-force method distinguishes between sensitivity, co-channel, upper- and lower adjacent channel interference with good precision and selects the filter that minimizes the MSE defined as the power of the residual interference and noise.

In some examples, sensitivity limited channels may result in a pass-through state in which no filtering is done. Upper and lower adjacent channel interference (ACI) results in notch filters targeting the specific ACI interference, while co-channel interference (CCI) results in a filter that effectively widens the bandwidth of the received signal by boosting high-frequency components. As a result, EIC ideally does not affect sensitivity performance, while it significantly increases ACI performance. It also improves CCI performance, but only marginally in most cases and not enough to pass DARP requirements alone.

In some examples, bursts received with an RSSI below a threshold value (e.g., −105 dBm) can be demodulated without performing EIC classification and filtering. The reason is that signals with such low magnitude may be severely degraded by thermal noise and therefore can lead to classification errors in the EIC. A risk of running the EIC is that the EIC may classify the burst as having co-channel interference (because of the poor signal quality and hence poor EIC performance) and consequently use the JDV for demodulation even though there is actually no interference.

JDV Decision Device

The following describes the JDV decision device 18. In some implementations, based on the effectiveness of EIC (and, e.g., in combination with the RSSI threshold) in detecting the CCI conditions that DARP is addressing, the selection of JDV demodulator can be tied with the CCI filter branch of the EIC, so that only propagation conditions identified as CCI dominant are demodulated with the JDV demodulator 24 while remaining cases are demodulated with the standard Viterbi demodulator 22.

In some cases it can be beneficial to limit the use of the JDV demodulator 24 even after the conditions have been detected to be CCI dominant, such as when the multipath delay exceeds the channel length supported by the JDV demodulator 24. This condition is detected by the so-called Long Channel Detection (LCD), which is based on a time-averaged profile of the CIR magnitude. The implemented LCD averages the squared magnitude of a 7-tap CIR for the wanted signal over several bursts and applies a threshold to how much energy that is allowed outside the 3 taps covered by the JDV demodulator 24. If the threshold is exceeded, the standard Viterbi demodulator 22 is used.

In some implementations, another switching criterion that can be used is the spectral analysis of the residual signal from the EIC filter's no-filtering path. If the magnitude of the first order Linear Prediction Coefficient (LPC) for the residual signal exceeds a predetermined threshold, it means the noise and interference is band limited and thereby unlikely to be dominated by thermal noise. Depending on the quadrant that the complex coefficient falls in, the interference is either characterized as CCI or ACI. For CCI the JDV demodulator 24 is used, while the remaining conditions rely on the standard Viterbi demodulator 22.

Figure 2:
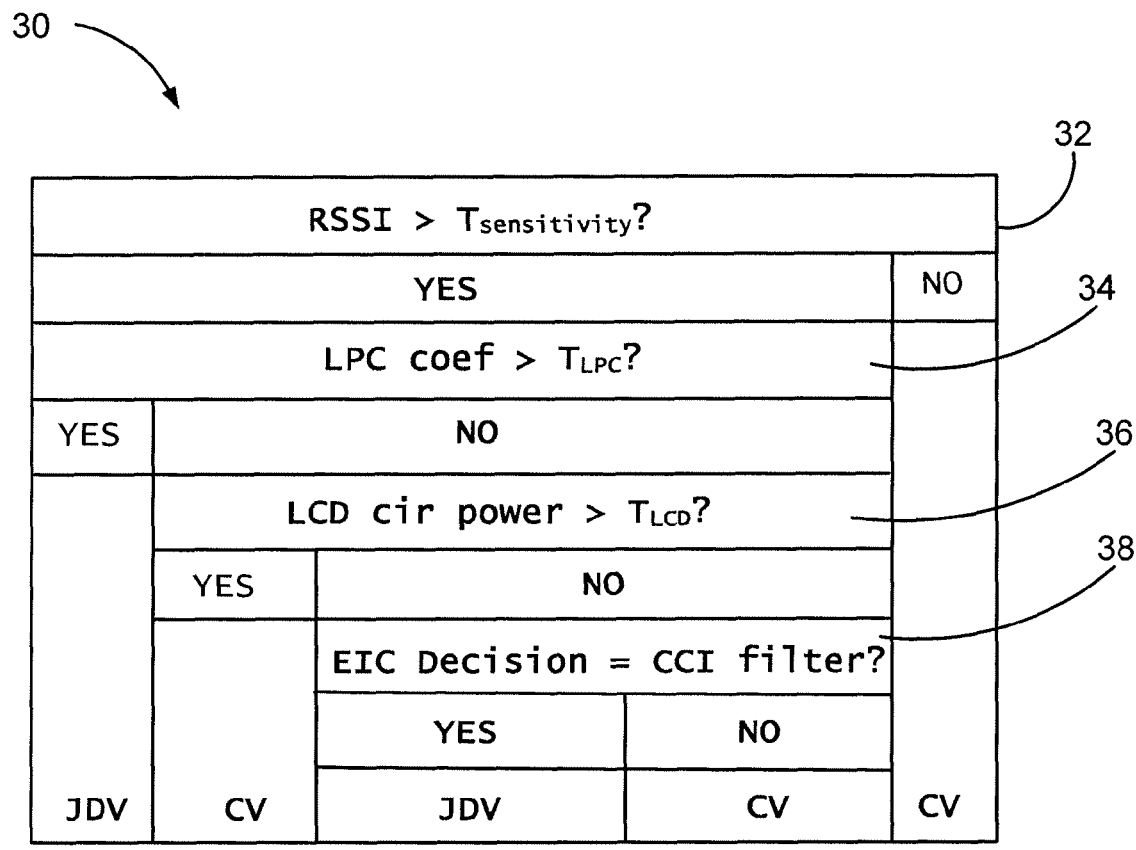
FIG. 2 is a table of decision logic for selecting demodulators.

Referring to FIG. 2, a table 30 shows an example of the decision logic for determining whether to use the standard Viterbi demodulator 22 or the JDV demodulator 24. The label "CV" refers to the standard or conventional Viterbi demodulator 22, and the label "JDV" refers to the JDV demodulator 24. Four tests are shown in the table 30. The tests can be used individually or in combination.

The first test (32) is to compare the estimated RSSI with a preset level, e.g., −105 dBm. It is assumed that signals below −105 dBm may lead to selection errors which may accidentally lead to the JDV demodulator 24 being selected despite the optimum receiver at this level is the standard Viterbi (CV) demodulator 22. If the level is below −105 dBm the standard Viterbi demodulator 22 is used, while levels above −105 dBm result in several additional tests.

The second test (34) is the spectral analysis that uses the power of the 1st order LPC coefficient for the residual noise when subtracting the theoretical contribution from the training sequence from the part of the received burst that corresponds to the training sequence. The larger the decision metric, the more "colored" the noise is, so a large value indicates a likely CCI present. The threshold is set conservatively, which allows it to positively identify CCI cases with high confidence. Therefore, the selection criteria is choosing the JDV demodulator 24 when the threshold is exceeded, while a lower value requires more tests before a decision is made.

The third test (36) is the Long Channel Detection (LCD), which seeks to identify propagation channel lengths that exceed the capacity of the LCD. The LCD threshold is set conservatively, so that the detection of long channels can be more accurate and so the standard Viterbi decoder 22 can be selected. If no LCD detection is made the fourth metric is analyzed, described below.

The fourth test (38) is the EIC classification. The EIC filtering block 16 applies four different filters, for example, AWGN, CCI, ACI1 and ACI2 to the received signal and selects the filter that minimizes an error metric. ACI1 and ACI2 are filters for interferences from higher- and lower-frequency adjacent channels. If the CCI filter is selected, it indicates the presence of a co-channel interference signal and leads to the selection of the JDV demodulator 24, while the other filters result in selecting the standard Viterbi (CV) demodulator 22.

Equalization

The following describes the equalization process. Based on the decision of the previous step the equalization is carried out by either the standard Viterbi demodulator 22 or the JDV demodulator 24. In both cases the result is a sequence of soft values that need to be scaled and quantized before they can be applied to channel decoding. The actual processes carried out to get to the soft values are different for each signal path.

Common for both the standard Viterbi demodulator 22 and the JDV demodulator 24 is that they deliver the soft values for subsequent processing, and a soft scaling metric that describes the quality of the demodulation carried out. The scaling metric is used in the subsequent soft value scaling and quantization.

Frequency Offset Estimation

Based on the received signal, the demodulator output and the CIR estimate for the wanted signal, the frequency offset is estimated and passed to higher layers for updating the control loop that keeps the MS synchronized to the network. This process can be independent of the selected demodulation method.

Soft Value Scaling and Quantization

From the soft scaling metric calculated by the demodulator, the last stage in the signal chain calculates the quantization step size on which the quantization of the equalizer output soft values is based. The 4-bit quantized soft values are packed into 16-bit words and passed to the remaining blocks of the decoding chain.

Joint Detection Viterbi Algorithm

The following describes examples of the algorithm used for the Joint Detection Viterbi (JDV) implementation of an SAIC receiver. Also described is how the SAIC demodulator interfaces to an existing GSM receiver. The solution includes two components: SAIC Channel Impulse Response Estimation and SAIC Joint Detection Viterbi demodulator.

JDV-Based SAIC Receiver

In some implementations, the SAIC solution based on the JDV includes several components embedded in a GSM demodulator or equalizer. The most important two are the special interference-aware channel impulse response (CIR) estimator and the JDV itself. The JDV can be further divided into a training part, that is responsible for estimating the interferer CIR, and the actual demodulation part.

SAIC CIR Estimation

Referring to FIG. 1 again, an SAIC CIR estimator 40 is based on the so-called constant modulus or constant envelope principle. This is a way of estimating the user CIR under co-channel interference, by modeling the interference as a signal of constant power. This model is true for a GMSK modulated interferer under static propagation conditions, but in practice is also a useful model for 8-PSK modulated signals and signals that experience fading channel conditions.

Signal Model

The signal model used includes the wanted signal, a signal component with constant modulus but random argument that represents interference and additive white Gaussian noise (AWGN):

$$r(n) = \sum_k h(k)d(n-k) + \lambda e^{j\varphi(n)} + w(n) \qquad (1)$$

where $r(n)$ is the received signal, $d(n)$ is the transmitted signal, $h(k)$ is the user CIR, $\lambda$ and $\varphi(n)$ are the modulus and argument of the interferer and $w(n)$ is AWGN.

Our aim is to determine $h(k)$, but if using Equ. 1 directly we will soon realize that we need to obtain a good estimate of $\varphi(n)$, which is difficult. Therefore we rearrange Equ. 1 and consider the power domain representation of the signal model $$\left\| r(n) - \sum_k h(k)d(n-k) \right\|^2 - \lambda^2 = \sigma_w^2 \quad (2)$$

where $\sigma_w$ is the variance of the AWGN. The power domain representation of the signal model in Equ. 2 inspires the following cost function:

$$J = \sum_n \left( \left\| r(n) - \sum_k h(k)d(n-k) \right\|^2 - \lambda^2 \right)^2 \quad (3)$$

The method of steepest descent is used to gradually update the channel estimate based on the gradient of the cost function:

$$h_{(i+1)}(m) = h_{(i)}(m) - \mu \frac{dJ}{dh(m)}$$

where $h_{(i)}(m)$ is the ith iteration of the mth CIR tap of the user propagation channel, $\mu$ is an arbitrary step size and $dJ/dh(m)$ is the gradient of the cost function with respect to the user CIR estimate. The initial estimate of the CIR can be found using correlation or similar method without regards to the interferer.

The gradient is found by differentiating J with respect to the CIR:

$$\frac{dJ}{dh(m)} = -\sum_n \left( \begin{array}{c} 4\left( \left\| r(n) - \sum_k h(k)d(n-k) \right\|^2 - \lambda^2 \right) \\ \left( r(n) - \sum_k h(k)d(n-k) \right)d(n-m) \end{array} \right) \quad (4)$$

This means that the CIR will be updated by the following iterative process:

$$h_{(i+1)}(m) = h_{(i)}(m) - \mu \sum_n (\|e(n)\|^2 - \lambda^2)e(n)d(n-m) \quad (5)$$

where e(n) is the difference between the actual and expected received symbol n. The transmitted data d(n) is generally unknown, except during the transmission of the training sequence, so the JDV CIR algorithm is operating on the 26 IQ symbols corresponding to the received training sequence only. Alternative to averaging over the entire training sequence, the general LMS formulation may be used in which the block over which the gradient is estimated is just one symbol. The LMS is faster, since it adapts the CIR for every symbol, while the general block-based steepest descent method is more accurate, because it effectively filters out much of the short term fluctuations in the channel estimation process.

Estimation of Interference Power

Since the interference power, $\lambda^2$, is unknown, it can be estimated jointly with the CIR. This may be done by a controlled convergence of $\lambda^2$ towards the long term mean of $\|e(n)\|^2$:

1. Initialize $\lambda_1^2$ to 0

2. Calculate $e(n) = r(n) - \sum_k h(k)d(n-k)$

3. $\lambda_{(i+1)}^2 = \alpha \lambda_{(1)}^2 + (1-\alpha)\|e(n)\|^2$,
   for $i = 1, 2, 3, \ldots$ where $\alpha$ is chosen appropriately and increased for every iteration.

Since the worst case performance arises when an asynchronous interferer starts transmitting near the middle of the training sequence (TS), the interference power estimation may be divided into two parts—one for the left half of the TS and one for the right half. This not only addresses situations where the interferer start exactly in the middle of the TS—it will improve performance for all relative positions of the interferer, by decreasing the overall sensitivity to changes in interference power. Note that only the interferer power estimation makes this distinction, not the CIR estimation.

Complete JDV CIR Algorithm

The steps above are combined into a single JDV CIR estimation algorithm. In some implementations the algorithm iterates over the training sequence several times. This allows both CIR and interference power to converge.

In some implementations, the complete algorithm can be as follows:

Initialize $\lambda_{(1)}^2$ to 0

Calculate initial CIR ($h_{(1)}$) using correlation of IQ with TS

For each iteration i=1, . . . , $N_i$:

a. Calculate $e(n) = r(n) - \sum_k h_{(i)}(k)d(n-k)$ b. $\lambda_{(i+1)}^2 = \alpha_{(i)}\lambda_{(i)}^2 + (1-\alpha_{(i)})\|e(n)\|^2$ c. $h_{(i+1)}(m) = h_{(i)}(m) - \mu \sum_n (\|e(n)\|^2 - \lambda_{(i)}^2)e(n)d(n-m)$ d. Reduce convergence speed: $\alpha_{(i+1)} = 0.75\alpha_{(i)} + 0.25$ Joint Detection Viterbi To better understand the Joint Detection Viterbi (JDV) demodulator it is helpful to first introduce the standard Viterbi demodulator.

Viterbi Equalization

In GSM, equalization (or demodulation) can be achieved by means of the Viterbi algorithm—either using the Ungerboeck or Forney approach. Here we will briefly explain the Forney approach since it is the basis for the Joint Detection Viterbi introduced in next section.

The Viterbi algorithm seeks to de-convolve the transmitted sequence from the received sequence by an analysis-by-synthesis method in which all possible transmitted sequences are convolved with the CIR in order to find the one that matches the received signal best. The match is determined by minimizing a cost function, e.g., the Euclidian distance metric, over the duration of the sequence to be demodulated.

Due to the memory of the propagation channel (characterized by the CIR length) this is not done on a symbol-by-symbol basis but requires evaluation of at least a sequence of data. The metric to be minimized is:

$$J = \sum_n \left\| r(n) - \sum_k h(k)\hat{d}(n-k) \right\|^2 \quad (6)$$

where $r(n)$ is the received sequence, $\hat{d}(n)$ are the hypothesized transmitted symbols of the set $\{-1,+1\}$ and $h(k)$ is the CIR estimate. The variable n spans the sequence length and k spans the memory of the propagation channel.

Each possible combination of past transmitted symbols within the span of the propagation channel is referred to as a state, and the symbols relating to that state is called a state vector. The Viterbi algorithm is most efficiently implemented by means of the so-called butterfly that is characterized by the changes to the state vector caused by a transition from one symbol to the next. Due to the causality of the system there are only a certain number of possible transitions, so the relationship between the state vector, $s(n)$, before and after a symbol transition is given by:

$$s(n) = \begin{bmatrix} s_0(n) \\ s_1(n) \\ \vdots \\ s_{L-1}(n) \end{bmatrix} \rightarrow s(n+1) \begin{bmatrix} \hat{d}(n) \\ s_0(n) \\ \vdots \\ s_{L-2}(n) \end{bmatrix} \quad (7)$$

where $s_k(n)$, is the k'th state bit represented by $\{-1,+1\}$ for the n'th symbol, $\hat{d}(n)$ is the hypothesized symbol and L is the channel order (Number of CIR taps less 1). Since $s_{L-1}(n)$ and $\hat{d}(n)$ are limited to $-1$ or $+1$ the transition can be described by four states. The states include two start states and two end states. Graphically this is represented by a butterfly 50 shown in FIG. 3.

Figure 3:
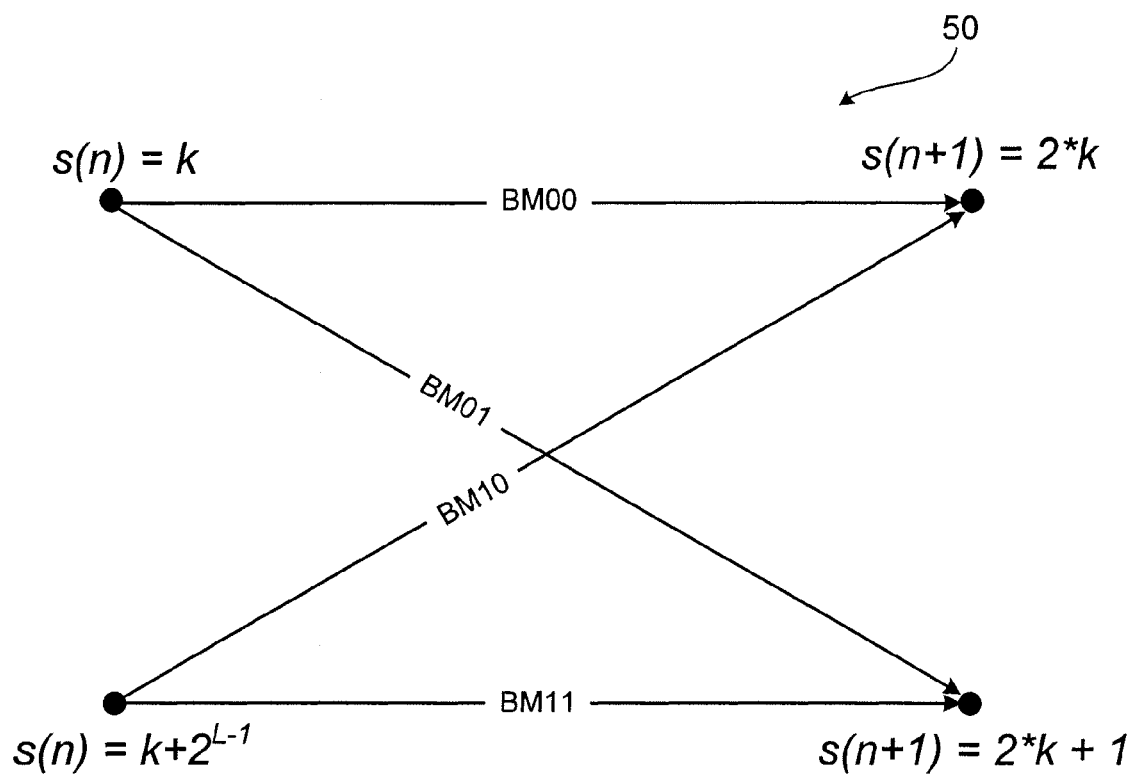
FIG. 3 is a Butterfly diagram for two start states and two end states.
Figure 4:
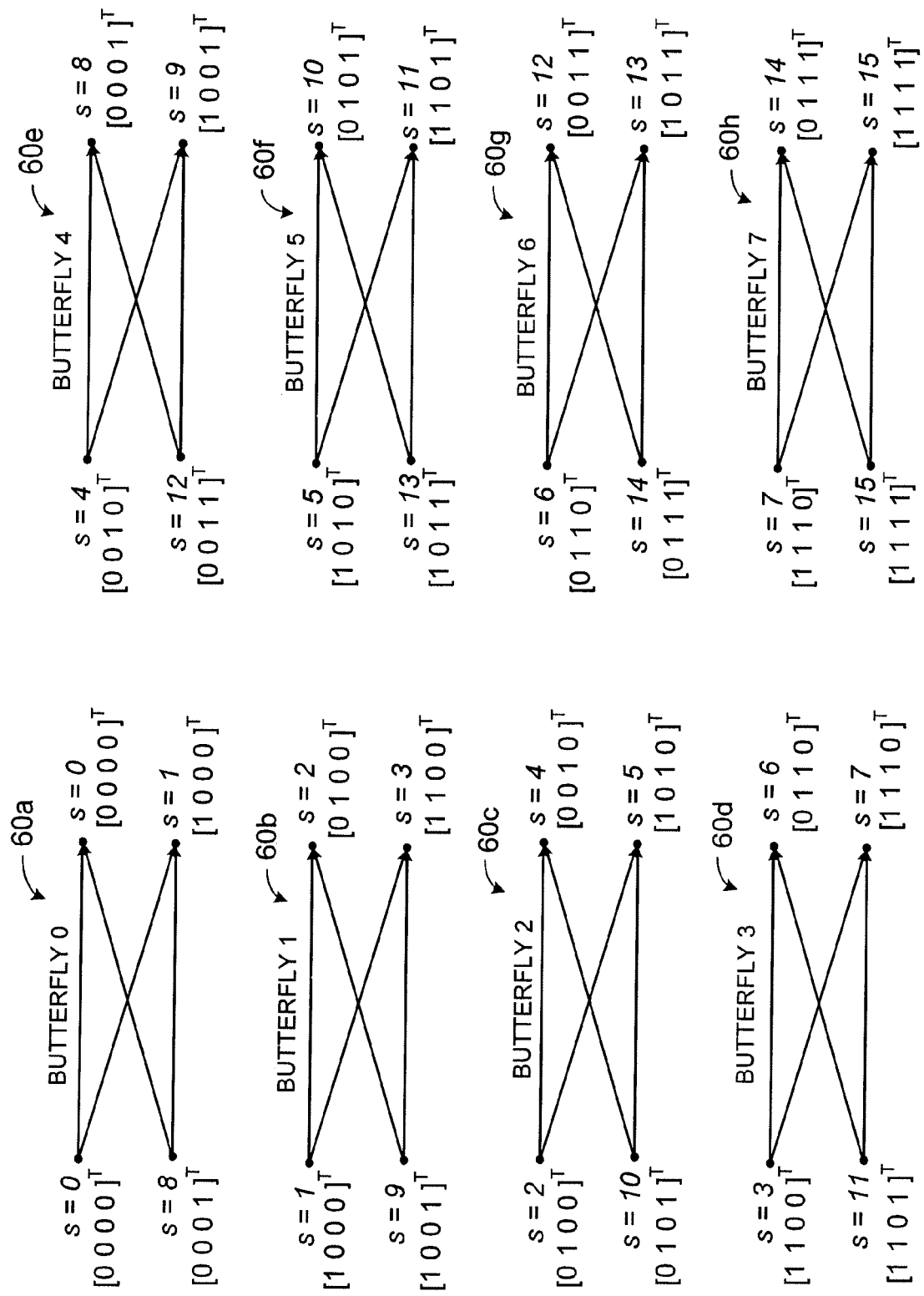
FIG. 4 shows eight butterfly diagrams describing sixteen states.

As indicated in FIG. 3, the source and destination state numbers are calculated using the butterfly number, k, that spans $0 \ldots (2^L-1)$. So, for example, in an implementation that has 5 CIR taps (L=4) there will be 8 butterflies (e.g., 60a to 60h) describing 16 states as shown in FIG. 4.

For each destination state there are two possible source states, each with its own Accumulated Path Metric (APM) determined by the sum of the relevant branch metric and the path metric associated with the source state. For each butterfly there are four APM's to calculate.

APM00=PM0+BM00

APM01=PM0+BM01

APM10=PM1+BM10

APM11=PM1+BM11 (8)

PM0 and PM1 are the surviving path metrics (defined later) from source state k and $k+2^{L-1}$. The branch metrics (BM's) are given by:

$$BM = \left| r(n) - \left( \hat{d}(n)h(0) + \sum_{k=0}^{k=L-1} s_k h(k+1) \right) \right|^2 \quad (9)$$

$$= |r(n) - T_{d(n),s}|^2$$

where the latter notation implies the convolution part may be stored in tables if the CIR estimate, h(k), is constant, i.e., a non-adaptive implementation.

The next step is to identify the optimal (minimal) APM for each state. The optimal APM is called the surviving path metric, and the index, j, of the optimal APM will describe the decision made at this state and is stored in the decision history.

PM$i$=min(APM$ji$), $i=\{0,1\}, j=\{0,1\}$ (10)

The procedure described above is known as the add-compare-select (ACS) procedure. Add describes the addition of path metrics and branch metrics. Compare describes the comparison of APM pairs that results in the decision bit (0 or 1) and finally select refers to the selection of the minimum APM to become the surviving path metric (PM).

A method that can be used for obtaining a confidence level for each decoded bit is based on the difference between the most probable 0-transition (APM0$x$) and the most probable 1-transition (APM1$x$):

SP0=min(APM0$i_k$), SP1=min(APM1$i_k$), for all states
 k

SV($n$)=SP0−SP1 where a positive SV indicates a transmitted +1 (1 bit) and a negative SV indicates a transmitted −1 (0 bit), where the magnitude of the soft value will correspond to the confidence level of the demodulated bit. So, for example, a large positive value means that a 1-bit was received and the bit-error-probability is low, while a small negative number means that a 0-bit was received, but with a higher probability of demodulation error.

At any given time the demodulated sequence can be found up to the point where the Viterbi algorithm has been executed. In some examples, in GSM the sequence is so short that the full sequence is usually processed before the demodulated sequence is determined. The process of finding this sequence is called Trace Back (TB) and identifies the optimum surviving path through the state trellis. First the decision associated with the optimum surviving path metric is found—this decision will describe the transition from the previous symbol which allows the TB algorithm to trace back to the previous decision and so forth.

Joint Demodulation Viterbi

In the Joint Demodulation Viterbi (JDV) the state vector is expanded to jointly describe two independent sequences—the user sequence (signal of interest) and the interfering sequence.

$$s(n) = \begin{bmatrix} s_{u,0}(n) \\ s_{u,1}(n) \\ \vdots \\ s_{u,L-1}(n) \\ \ldots \\ s_{i,0}(n) \\ s_{i,1}(n) \\ \vdots \\ s_{i,L-1}(n) \end{bmatrix} \rightarrow s(n+1) \begin{bmatrix} \hat{d}_u(n) \\ s_{u,0}(n) \\ \vdots \\ s_{u,L-2}(n) \\ \ldots \\ \hat{d}_i(n) \\ s_{i,0}(n) \\ \vdots \\ s_{i,L-2}(n) \end{bmatrix} \quad (11)$$

Here the sub-indices u and i distinguish between the user and the interferer. The line dividing the state vector indicates that it is disconnected in time across the middle—in fact, each half represents overlapping time, meaning $\hat{d}_i(n)$ and $\hat{d}_u(n)$ are estimates of the transmitted user and interference symbols and the same time instant. For convenience the state vector may also be written as $$[s_{u,0}(n)s_{u,1}(n)|s_{i,0}(n)s_{i,1}(n)]$$

for a 3-tap CIR.

Figure 5:
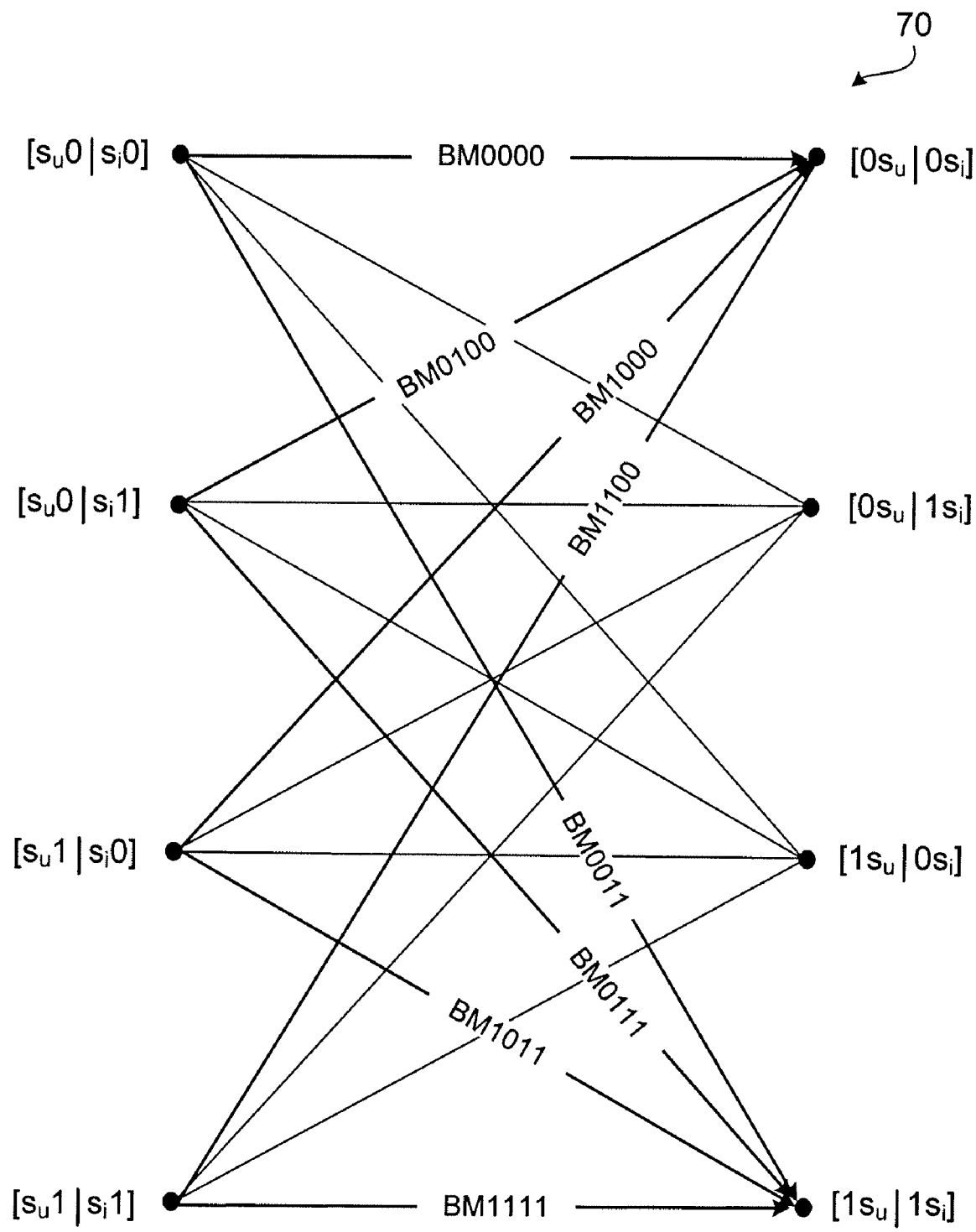
FIG. 5 is a butterfly diagram for four start states and four end states.

At first hand the complexity (measured in terms of possible transitions) resulting from doubling the length of the state vector may seem to be squared, but in fact it is twice that because of the independence between the user and interfering part making twice the number of possible transitions into each state. This can be seen from the butterfly 70 in FIG. 5, where each destination state now has four possible source states (some transitions are shown in gray for clarity).

The branch metric associated with the JDV is given by:

$$BM = \left| r(n) - \left( \left( \hat{d}_u(n)h_u(0) + \sum_{k=0}^{k=L-1} s_{u,k}h_u(k+1) \right) + \right. \right. \tag{12}$$
$$\left. \left. \left( \hat{d}_i(n)h_i(0) + \sum_{k=0}^{k=L-1} s_{i,k}h_i(k+1) \right) \right) \right|^2$$
$$= \left| r(n) - \left( T_{u,\hat{d}_u(n),s_u} + T_{i,\hat{d}_i(n),s_i} \right) \right|^2$$

In order to improve performance, $h_u(k)$ and $h_i(k)$ are updated for every symbol using a least mean squares (LMS) algorithm based on estimates of the transmitted user and interferer sequences. This means that the algorithm requires recalculation of the tables $T_u$ and $T_i$ at regular intervals, up to once per symbol.

The ACS part follows, but now there are four possible source states for each destination state, so each decision may be described using two bits. The trace back should also handle two bits for each state transition. One bit describes the user sequence, and one bit describes the interferer sequence. Even though the interferer sequence may not be needed for further processing it is necessary to keep track of it for proper trace back.

$$PMi=\min(APMji), i=\{00,01,10,11\}, j=\{00,01,10,11\} \tag{13}$$

There are two soft values for each received symbol. One soft value is for the user and the other is for the interferer:

$$SP0^u=\min(APM0xxx_k), SP1_u=\min(APM1xxx_k), \forall k,x$$
$$SV_u(n)=SP0_u-SP1_u$$

$$SP0_i=\min(APMx0xx_k), SP1_i=\min(APMx1xx_k), \forall k,x$$
$$SV_i(n)=SP0_i-SP1_i$$

The soft value for the interfering sequence is only used to obtain an estimate of the transmitted interfering sequence used for CIR updating, so this can be omitted if the interfering sequence is estimated in a different manner. For example, the interfering sequence may be estimated by piecewise trace back.

The LMS is used for updating the CIR estimates. The estimation error is obtained from the estimates of the user and interfering sequence in combination with the tables used for calculating the branch metrics:

$$e = r(n) - \left( \left( \sum_{k=0}^{k=L} \hat{d}_u(n-k)h_u(k) \right) + \left( \sum_{k=0}^{k=L} \hat{d}_i(n-k)h_i(k) \right) \right) \tag{14}$$
$$= r(n) - \left( T_{u,\hat{d}_u} + T_{i,\hat{d}_i} \right)$$

The error estimate, e, is used in the standard LMS algorithm:

$$h_u^{(n+1)}(k)=h_u^{(n)}(k)+\gamma_u \cdot e \cdot \hat{d}_u(n-k), \forall k$$

$$h_i^{(n+1)}(k)=h_i^{(n)}(k)+\gamma_i \cdot e \cdot \hat{d}_m(n-k), \forall k \tag{15}$$

where $\gamma_u$ and $\gamma_i$ are step size parameters that determine the adaptation speed of the LMS.

Certain implementations of the JDV gain from being run iteratively in order to obtain better CIR estimates, e.g., when the JDV is started using a Dirach's pulse as initial CIR estimate for the interfering channel. With the method for jointly obtaining CIR estimates for both the user and interfering sequence (described in next section), the quality of the CIR estimates is very high after running the JDV algorithm once.

Interferer CIR Estimation

Even though the JDV may be initialized with a Dirach's pulse, it is beneficial to exploit the training sequence to train the JDV equalizer. For example, this can be done by the same JDV implementation that is used for data demodulation, or be implemented as a separate task. One of the reasons is that the complexity can be reduced in the guided mode, which results in a relative complexity per symbol of about a quarter of that of the full JDV for a 3-tap CIR.

Since $d_u(n)$ is known for the duration of the training sequence, the JDV may be guided into the correct state for the user sequence. The demodulation of the interferer becomes more precise. This is true for the branch metric, derived from Equ. 12 as well as the LMS, derived from Equ. 14.

JDV Branch Metric:

$$BM = \left| r(n) - \left( \left( \sum_{k=0}^{k=L} d_u(n-k)h_u(k) \right) + \right. \right. \tag{16}$$
$$\left. \left. \left( \hat{d}_i(n)h_i(0) + \sum_{k=0}^{k=L-1} s_{i,k}h_i(k+1) \right) \right) \right|^2$$
$$= \left| r(n) - \left( T_{u,d_u} + T_{i,\hat{d}_i(n),s_i} \right) \right|^2$$

LMS Estimation Error:

$$e = r(n) - \left( \left( \sum_{k=0}^{k=L} d_u(n-k)h_u(k) \right) + \left( \sum_{k=0}^{k=L} \hat{d}_i(n-k)h_i(k) \right) \right) \tag{17}$$
$$= r(n) - \left( T_{u,d_u} + T_{i,\hat{d}_i} \right)$$

Both the user and interferer CIR are adapted as in the main JDV, but initially the interferer CIR is adapted much more aggressively in order to speed up convergence. Several iterations are run by passing over the training sequence multiple times, and for each pass the LMS step size parameter is reduced in order to improve convergence error at the cost of reduced convergence speed.

Figure 6:
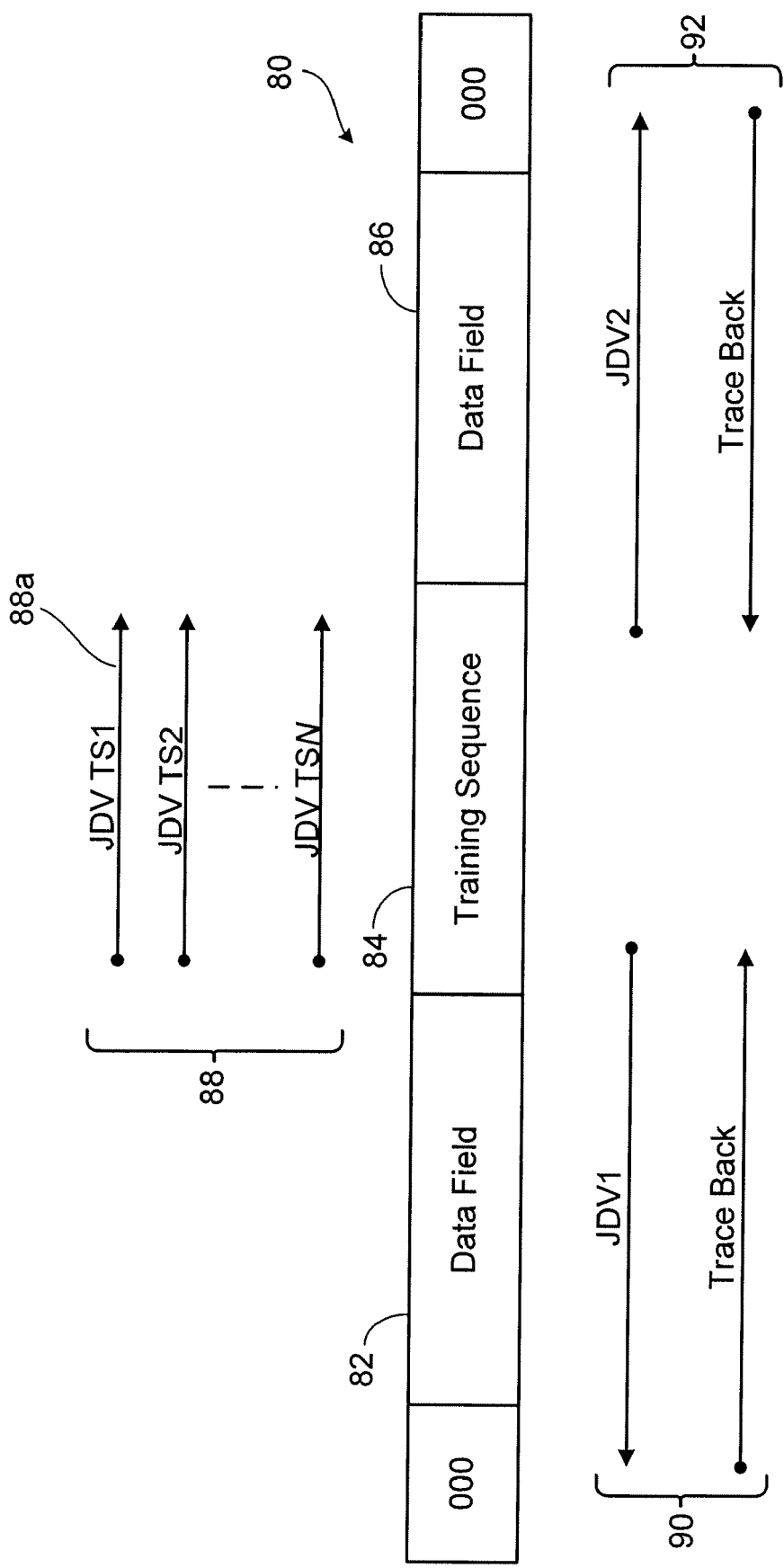
FIG. 6 is a diagram showing a method for decoding a burst.

FIG. 6 is a diagram showing a method for decoding a burst signal 80. The burst signal 80 includes a first data field 82, a training sequence 84, and a second data field 86. During a transmission, the training sequence 84 is known to both the transmitter and the receiver of the burst signal 80 (though the training sequence actually received at the receiver may be different from the training sequence transmitted by the transmitter due to interference or signal degradation). The CIR estimation module 40 (FIG. 1) can provide an initial estimate of the channel coefficients for the desired signal based on, for example, cross correlation of the received signal and a known training sequence. As shown in FIG. 6, a JDV algorithm is iterated over the training sequence (88a), using the initial channel estimation for the desired signal provided by the CIR estimation module 40. The JDV algorithm is iterated over the training sequence several times (88), and in the process, channel estimations for the desired signal and the interference signal are obtained.

In some implementations, iterating the JDV algorithm over the training sequence involves building a tree or trellis data structure to evaluate possible transmitted training sequences, and calculating branch metrics and estimation errors based on information about the known transmitted training sequence. This can be seen in Equations 16 and 17 above, where the transmitted symbols $d_u(n)$ are known symbols. Because the actual transmitted training sequence is known, the JDV algorithm selects the possible transmitted training sequences that are consistent with the known transmitted training sequence, eliminating the ones that are inconsistent. This increases the speed for iterating the JDV algorithm over the training sequence.

As discussed above, iterating the JDV algorithm over the training sequence several times produces information about channel estimations for both the desired signal and the interference signal. The channel estimations (obtained from iterating the JDV algorithm over the training sequence) are used as initial channel estimates for iterating the JDV algorithm over the first data field 1 (90). By using information about channel estimations for both the desired signal and the interference signal, iterating the JDV algorithm over the first data field 82 once may produce sufficiently accurate soft values. In some implementations, it is not necessary to iterate the JDV algorithm over the first data field 82 more than once. The JDV algorithm is iterated over the second data field 86 once (92) to produce soft values for the second data field 86.

An advantage of iterating the JDV algorithm over the training sequence to obtain channel estimations for the interference signal is that the JDV algorithm can be executed faster by eliminating possible transmitted training sequences that are inconsistent with the known training sequence. After iterating the JDV algorithm over the training sequence several times, the channel estimations for the desired signal and the interference signal can be sufficiently accurate so that the JDV algorithm can be applied to each of the data fields 82 and 86 once, instead of multiple times if the initial channel estimates were less accurate.

In some implementations, due to the possibility of an asynchronous interferer ramping up in the middle of the training sequence, the processing is divided into two parts: one for the left half and one for the right half of the training sequence. The user CIR is unaffected, but the interferer CIR is estimated independently in both halves if the two halves of the training sequence have significantly different interference power. This is further described below.

JDV Processing Scheme

Due to the fact that the CIR for the user and interferer is derived over the training sequence, they describe the received signal better near the training sequence and gradually worse as the distance to the training sequence increases. This is caused by two physical phenomena—changes in the actual CIR over time, and to a greater extent frequency offset that leads to gradually increasing phase offsets towards the ends of the burst. In some examples, to achieve good performance, the JDV works away from the training sequence and towards the ends of the burst. This allows the JDV to start out with the high quality CIR derived over the training sequence and gradually adapt to the changing conditions as it moves towards the ends of the burst. This means that trace back is run from the ends of the burst and towards the middle. This process is illustrated in FIG. 6.

For both JDV and trace back processing, the start states are known for the user and unknown for the interferer. For the JDV the start state for the user is given by the training sequence symbols, which are used to bias the initial path metric. All interferer states are initialized with neutral values. In the trace back the start state is determined by the tail bits (all 0's) for the user, while the interferer start state is determined by selecting the minimum path metric among the interferer states.

Effect of Splitting Training Sequence for Asynchronous Interferer

Figure 7:
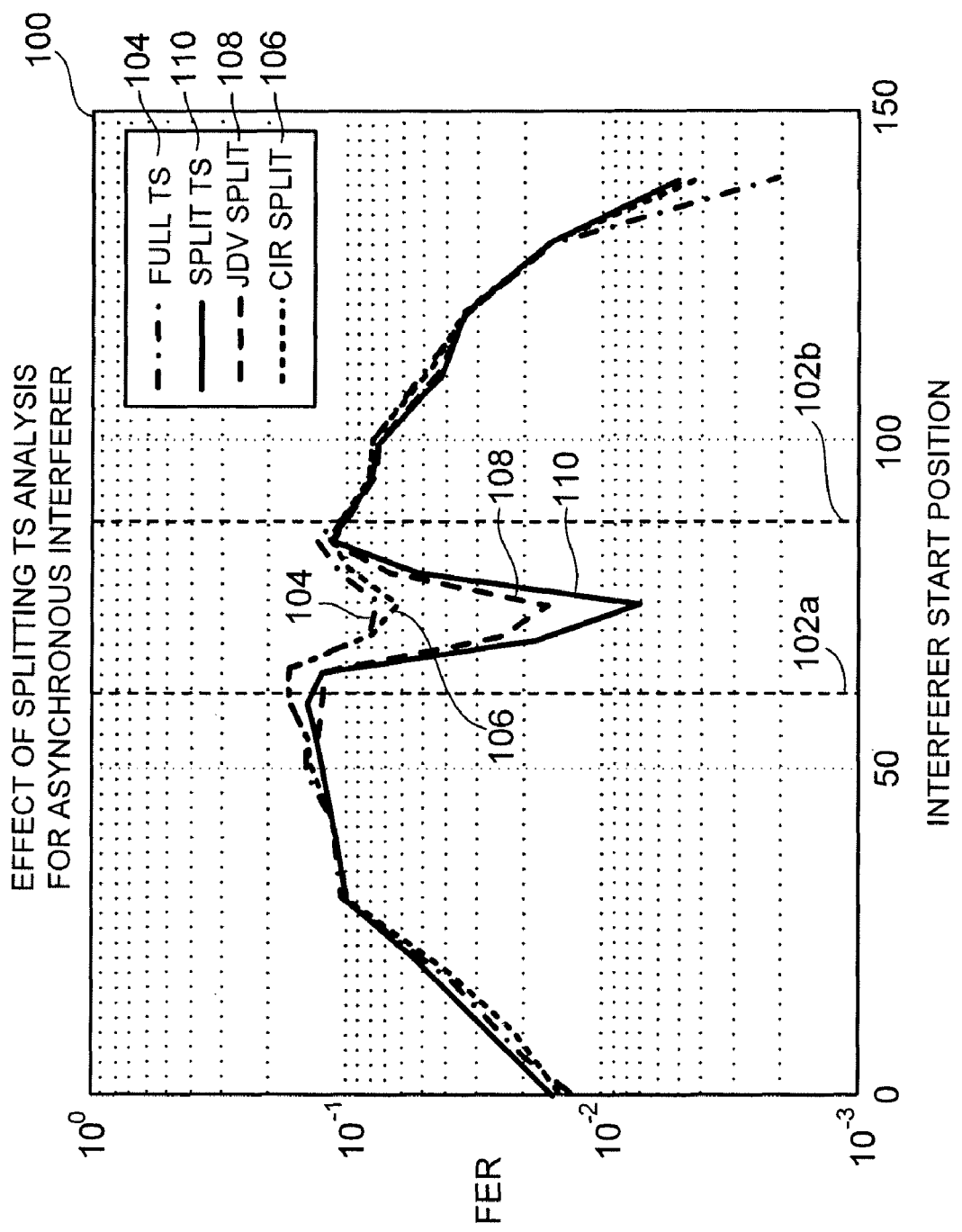
FIG. 7 is a plot showing the effect of splitting training sequence analysis in the presence of an asynchronous interferer.

FIG. 7 is a diagram 100 showing an example of the effect of splitting the training sequence analysis in the CIR and JDV blocks (e.g., 40 and 24, respectively, of FIG. 1) when experiencing an asynchronous interferer. The horizontal axis represents the interferer start position (e.g., the location where the interference signal starts in the burst signal of FIG. 6). The vertical axis represents the frame error rate (FER). The two vertical dashed lines 102a and 102b show the boundaries of the training sequence of the user signal.

In some examples, the effect of an interferer, which may start transmitting anywhere in the training sequence of the wanted signal, may be significantly reduced when splitting the training sequence analysis in two parts. Splitting the training sequence analysis may come at no or little cost in complexity and performance when the interferer is synchronous. Splitting the training sequence may be used for both CIR and JDV.

A curve 104 represents the frame error rates when the JDV algorithm is applied to the entire training sequence, and a single estimation of the interferer signal power is determined for the entire training sequence. No splitting is used for curve 104.

A curve 106 represents the frame error rates when estimation of the power of the interference signal is split over the training sequence. For example, the CIR estimation module 40 (FIG. 1) estimates a first interference signal power for a first half of the training sequence, and estimates a second interference signal power for a second half of the training sequence. In the example of curve 106, the JDV algorithm is applied to the whole training sequence. The frame error rates for the curve 106 are generally lower than those of the curve 104.

A curve 108 represents the frame error rates when the JDV algorithm is iteratively applied to each half of the training sequence. For example, the JDV algorithm is iteratively applied to a first half of the training sequence to obtain channel estimations for user and interferer signals, and the channel estimations are used as initial channel estimates when applying the JDV algorithm to the first data field (e.g., 82 in FIG. 6). The JDV algorithm is iteratively applied to a second half of the training sequence to obtain channel estimations for user and interferer signals, and the channel estimations are used as initial channel estimates when applying the JDV algorithm to the second data field (e.g., 86 in FIG. 6).

If the interference signal starts at the middle of the burst, there is no interference signal during the first data field and the first half of the training sequence, so the initial channel estimates of the user and interfere (obtained by applying the JDV algorithm over the first half of the training sequence) are accurate for the first data field. There is interference signal during the second half of the training sequence and the second data field, so the initial channel estimates of the user and interferer (obtained by applying the JDV algorithm over the second half of the training sequence) are also accurate for the second data field. The frame error rates for the curve 108 are generally lower than those of the curve 106.

A curve 110 represents the frame error rates when estimation of the interference signal power is performed for each half of the training sequence and the JDV algorithm is iteratively applied to each half of the training sequence. Splitting the training sequence analysis in both the CIR and JDV blocks can further reduce the frame error rate. The frame error rates for the curve 110 are generally lower than those of the curve 108.

External Interface

In some implementations, the external input to the JDV CIR estimation and Equalizer apart from the IQ, TS and burst type (NB/SB) is a detection indicator for an asynchronous interferer that ramps up near the center of the training sequence. Unless dealt with, this scenario can be the worst case scenario for a training sequence guided SAIC, because it will make the training sequence a poor representation of the received signal in either burst half. An interferer that ramps up immediately before or after the training sequence will only affect one half of the burst and can be tolerated to a certain extent.

By dividing the training sequence in two separate halves no matter where the interferer ramps up, at least half of the burst is well described by the nearest half of the training sequence. This property is used extensively, and is partly controlled by a parameter PowerRatio.

The received signal corresponding to the training sequence is correlated with the transmitted training sequence to form a basic CIR estimate for the user. This CIR is convolved with the training sequence to form an estimate of the received training sequence without interference and noise, which is subtracted from the received signal. The residual signal is an estimate of the noise and interference, which is divided into two halves. The parameter PowerRatio is the absolute value of the difference of the power of the interference in the left and right training sequence half divided by the total interference power:

$$R_p = \frac{|P_{left} - P_{right}|}{P_{left} + P_{right}} \quad (18)$$

As an alternative to calculating this parameter outside the SAIC Equalizer it may be done by reusing the parameters InterferencePowerL and InterferencePowerR that are already calculated within EQ_GMSK_CIR_Estimation_JDV( ). The parameters InterferencePowerL and InterferencePowerR correspond to the power estimates from the JDV CIR algorithm for the left and right training sequence halves.

Figure 8:
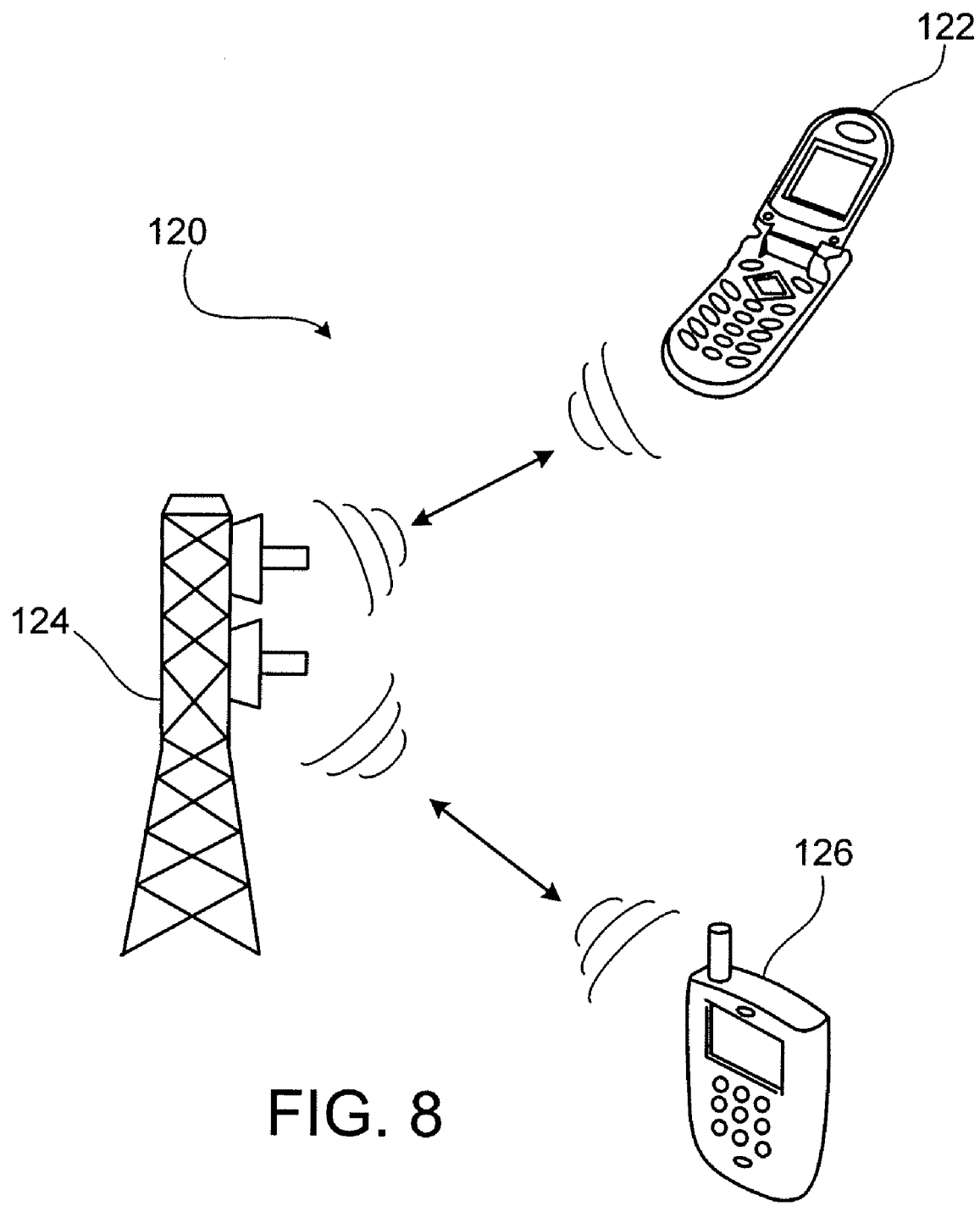
FIG. 8 is a diagram of an example wireless network.

FIG. 8 is a diagram of an example wireless network 120, in which a wireless device or mobile station 122 (also referred to as user equipment in some telecommunication standards) includes the receiver 10 of FIG. 1 for demodulating signals received from a cellular network represented by a cellular tower 124, and a transmitter for enabling uplink transmissions to the cellular network. The receiver 10 may be fabricated as part of an integrated circuit, such as a wireless chipset, and mounted on a circuit board in the mobile station 122. The cellular network may connect the mobile station 122 to other devices, such as other mobile stations 126.

Figure 9:
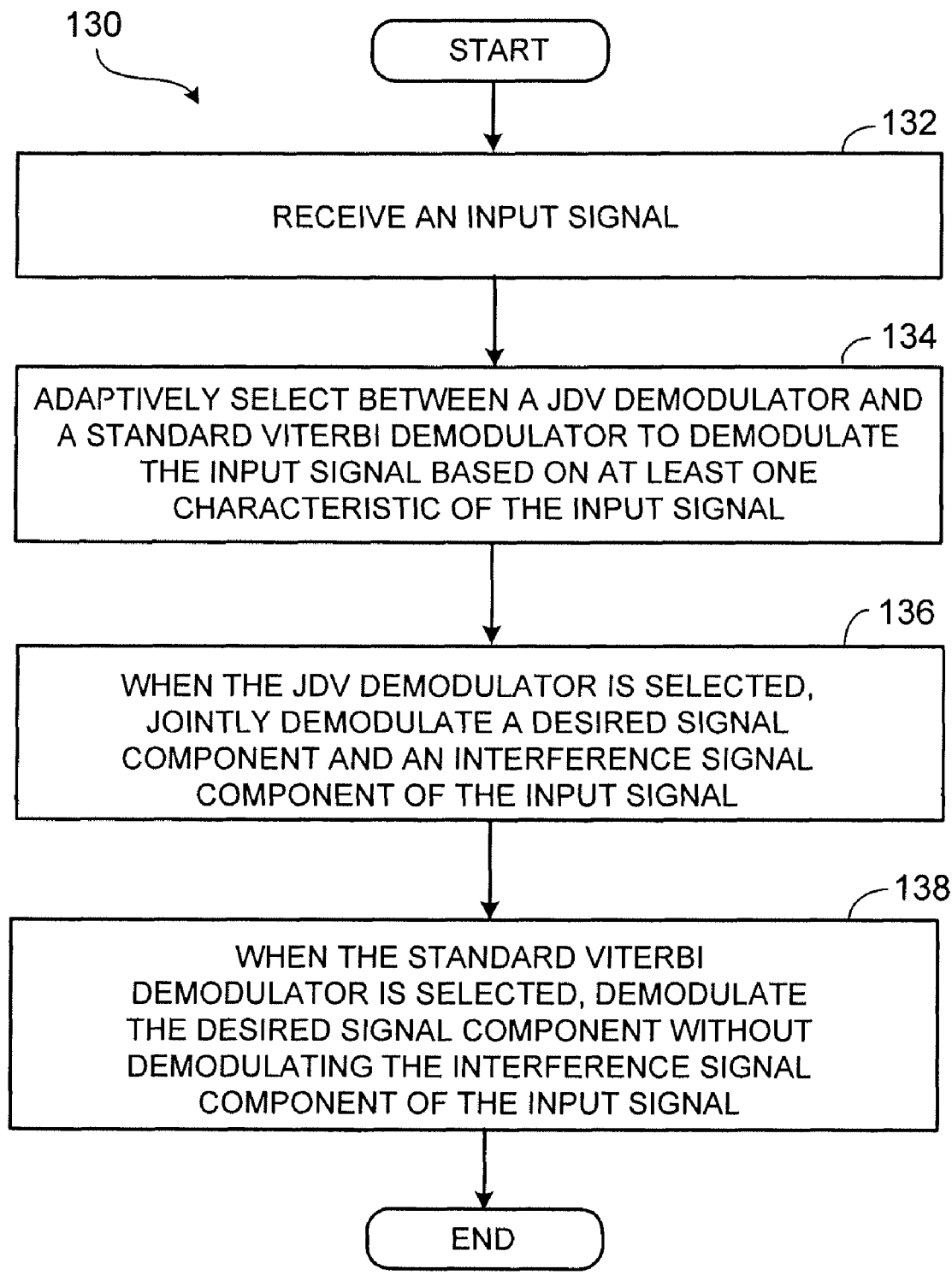
FIGS. 9 and 10 are flow diagrams of example processes.

FIG. 9 is a flow diagram of an example process 130 for demodulating a signal using a standard Viterbi demodulator and a joint detection Viterbi demodulator. The process 130 includes receiving an input signal (132), such as a GSM burst signal, and adaptively selecting between a joint detection Viterbi demodulator and a standard Viterbi demodulator to demodulate the input signal based on at least one characteristic of the input signal (134). Examples of the characteristic of the input signal include a received signal strength indicator (RSSI) of the input signal, a filter selection in an interference cancellation unit, a propagation channel length associated with the input signal, and a magnitude of a linear prediction coefficient of the interference signal component of the input signal.

When the joint detection Viterbi demodulator is selected, a desired signal component and an interference signal component of the input signal are jointly demodulated (136). When the standard Viterbi demodulator is selected, the desired signal component is demodulated without demodulating the interference signal component of the input signal (138).

Figure 10:
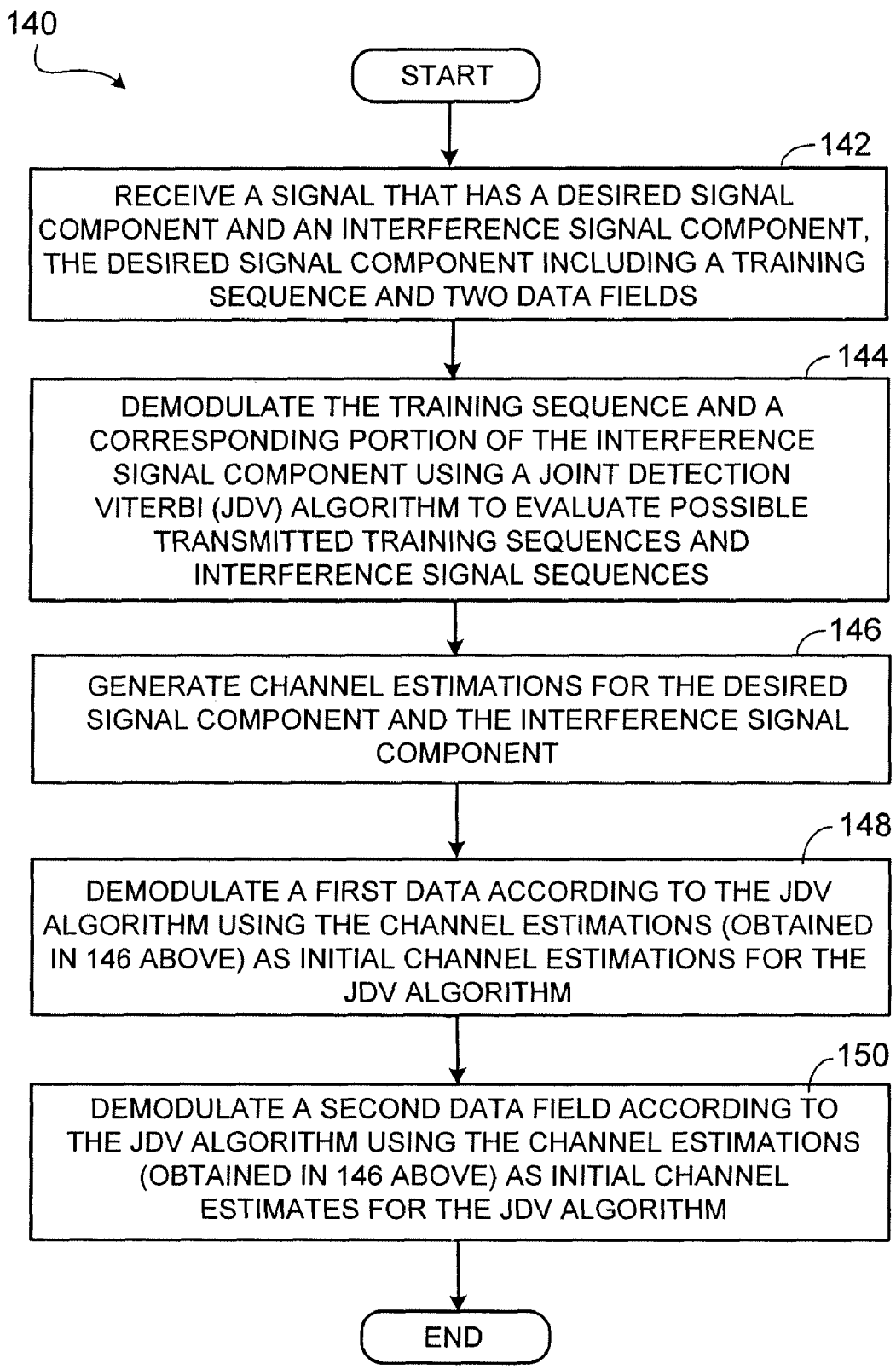

FIG. 10 is a flow diagram of an example process 140 for demodulating a training sequence and data fields using a JDV algorithm. The process 140 includes receiving a signal that has a desired signal component and an interference signal component, the desired signal component including a training sequence and two data fields (142). For example, the signal can have a format similar to that shown in FIG. 6.

The training sequence and a corresponding portion of the interference signal component are demodulated using a joint detection Viterbi (JDV) algorithm to evaluate possible transmitted training sequences and interference signal sequences (144). Channel estimations for the desired signal component and the interference signal component are generated (146).

A first data field is demodulated according to the JDV algorithm using the channel estimations as initial channel estimates for the JDV algorithm (148). A second data field is demodulated according to the JDV algorithm using the channel estimations as initial channel estimates for the JDV algorithm (150).

Although some examples have been discussed above, other implementations and applications are also within the scope of the following claims. For example, the standard Viterbi demodulator 22 and the JDV demodulator 24 can be replaced by other types of demodulators. The criteria for selecting the standard Viterbi demodulator 22 or the JDV demodulator 24 can be different from those described above. While the JDV algorithm is describes as demodulating signals from a user and an interferer, the same principles can be applied to demodulating signals from a user and multiple interferers.

The systems or devices described above may include additional components that are not described or shown in the figures. Some of the blocks in FIG. 1 can be implemented in digital electronic circuitry, integrated circuitry, specially designed ASICs (application specific integrated circuits), computer hardware, firmware, software, and/or combinations thereof. The software can be executed in a microcontroller or a digital signal processor. The operation of the blocks in FIG. 1 can be controlled by, e.g., software executing in a data processor.

The logic flows depicted in the figures do not require the particular order shown, or sequential order, to achieve desirable results. Other steps may be provided, or steps may be eliminated, from the described flows. Although several applications and methods have been described, it should be recognized that numerous other applications are contemplated. Accordingly, other implementations are within the scope of the following claims.

What is claimed is:

1. A method comprising:
receiving a signal that includes a desired signal component and an interference signal component, the desired signal component including a training sequence and at least one data field;
demodulating the training sequence and a corresponding portion of the interference signal component using a joint detection Viterbi (JDV) algorithm to evaluate possible transmitted training sequences and interference signal sequences, and generate channel estimations for the desired signal component and the interference signal component, wherein demodulating the training sequence comprises convolving a channel impulse response with a plurality of known possible transmitted sequences; and
demodulating the at least one data field according to the JDV algorithm using the channel estimations as initial channel estimates for the JDV algorithm.

2. The method of claim 1 in which demodulating the training sequence and the corresponding portion of the interference signal component comprises eliminating possible transmitted training sequences that are inconsistent with a known transmitted training sequence.

3. The method of claim 1 in which the desired signal component complies with Global System for Mobile Communications (GSM) standard.

4. The method of claim 1 in which the interference signal component comprises a co-channel interference signal.

5. The method of claim 1 in which demodulating the training sequence and the corresponding portion of the interference signal component using the JDV algorithm comprises iterating the JDV algorithm over the training sequence two or more times.

6. The method of claim 1 in which demodulating the training sequence and the corresponding portion of the interference signal component using the JDV algorithm comprises calculating branch metrics using information about a known transmitted training sequence.

7. The method of claim 6 in which demodulating the at least one data field according to the JDV algorithm comprises calculating branch metrics using information about estimated transmitted data symbols.

8. The method of claim 1 in which the received signal comprises a first data field followed by the training sequence followed by a second data field.

9. The method of claim 8 in which demodulating the training sequence comprises applying the JDV algorithm to a first portion of the training sequence to obtain a first channel estimation for the desired signal component and the interference signal component, and applying the JDV algorithm to a second portion of the training sequence to obtain a second channel estimation for the desired signal component and the interference signal component.

10. The method of claim 9, further comprising applying the JDV algorithm to demodulate the first data field using the first channel estimation as an initial channel estimate, and applying the JDV algorithm to demodulate the second data field using the second channel estimation as an initial channel estimate.

11. The method of claim 1, further comprising generating the initial channel estimates for the desired signal component based on cross correlation of the received signal and a known training sequence, the initial channel estimates for the desired signal component being used by the JDV algorithm for demodulating the training sequence and the corresponding portion of the interference signal component.

12. A method comprising:
applying a joint detection Viterbi (JDV) algorithm to demodulate a training sequence of an input signal to obtain information about channel characteristics of a desired signal component and an interference signal component of the input signal, wherein demodulating the training sequence comprises convolving a channel impulse response with a plurality of known possible transmitted sequences; and
applying the JDV algorithm to demodulate at least one data field of the input signal using initial channel estimates that are based on the information about channel characteristics of the desired signal component and the interference signal component obtained when demodulating the training sequence.

13. The method of claim 12 in which the input signal complies with Global System for Mobile Communications (GSM) standard.

14. The method of claim 12 in which applying the JDV algorithm comprises selecting one of the plurality of known possible transmitted sequences that best matches a received signal.

15. The method of claim 12 in which applying the JDV algorithm to demodulate the training sequence comprises evaluating various possible transmitted training sequences and interference signal sequences based on accumulated path metrics, and selecting one or more possible transmitted training sequences that are consistent with a known transmitted training sequence.

16. The method of claim 12 in which applying the JDV algorithm to demodulate the training sequence comprises calculating branch metrics using a known transmitted training sequence.

17. The method of claim 16 in which applying the JDV algorithm to demodulate the at least one data field comprises calculating branch metrics using estimated transmitted data symbols.

18. The method of claim 12 in which applying the JDV algorithm to demodulate the training sequence comprises iteratively applying the JDV algorithm to the training sequence two or more times.

19. The method of claim 12 in which the input signal comprises a first data field followed by the training sequence followed by a second data field.

20. The method of claim 19 in which applying the JDV algorithm to demodulate the training sequence comprises applying the JDV algorithm to a first portion of the training sequence to obtain a first channel estimation for the desired signal component and the interference signal component, and applying the JDV algorithm to a second portion of the training sequence to obtain a second channel estimation for the desired signal component and the interference signal component.

21. The method of claim 20, further comprising applying the JDV algorithm to demodulate the first data field using the first channel estimation as an initial channel estimate, and applying the JDV algorithm to demodulate the second data field using the second channel estimation as an initial channel estimate.

22. A method comprising:
receiving a signal that includes a desired signal component and an interference signal component, the desired signal component including a training sequence, a first data field, and a second data field;

iteratively applying a joint detection Viterbi (JDV) algorithm to a first portion of the training sequence to generate first channel estimations for the desired signal component and the interference signal component;

iteratively applying the JDV algorithm to a second portion of the training sequence to generate second channel estimations for the desired signal component and the interference signal component;

demodulating the first data field according to the JDV algorithm using the first channel estimations as initial channel estimates for the JDV algorithm; and demodulating the second data field according to the JDV algorithm using the second channel estimations as initial channel estimates for the JDV algorithm.

23. The method of claim 22 in which the received signal complies with Global System for Mobile Communications (GSM) standard.

24. The method of claim 22 in which applying the JDV algorithm to the first portion of the training sequence comprises evaluating various possible transmitted training sequences and interference signal sequences based on accumulated path metrics, and selecting one or more possible transmitted training sequences that are consistent with a known transmitted training sequence.

25. An apparatus comprising:
a wireless receiver comprising a joint detection Viterbi (JDV) demodulator to
apply a JDV algorithm to a training sequence of a burst signal to demodulate the training sequence and determine channel estimations for a desired signal component and an interference signal component, wherein the JDV demodulator is configured to convolve a channel impulse response with a plurality of known possible transmitted sequences, and
apply the JDV algorithm to at least one data field of the burst signal to demodulate a data sequence in the at least one data field using the channel estimations as initial channel estimates for the JDV algorithm.

26. The apparatus of claim 25 in which the wireless receiver further comprises a channel impulse response estimator to provide the initial channel estimates for the desired signal when applying the JDV algorithm to the training sequence.

27. The apparatus of claim 25 in which the burst signal comprises a GSM (Global System for Mobile Communications) burst signal.

28. The apparatus of claim 25 in which the JDV demodulator builds a tree or trellis data structure to evaluate possible transmitted training sequences and selects one or more possible transmitted training sequences that are consistent with a known transmitted training sequence.

29. The apparatus of claim 28 in which the JDV demodulator calculates branch metrics using information about the known transmitted training sequence when demodulating the training sequence.

30. The apparatus of claim 28 in which the JDV demodulator calculates branch metrics using information about estimated transmitted data symbols when demodulating the data sequence.

31. The apparatus of claim 25 in which the JDV demodulator iterates the JDV algorithm over the training sequence two or more times.

32. The apparatus of claim 31 in which the JDV demodulator iterates the JDV algorithm over each of the at least one data field not more than once.

33. The apparatus of claim 25 in which the burst signal comprises a first data field followed by the training sequence followed by a second data field.

34. The apparatus of claim 33 in which the JDV demodulator applies the JDV algorithm to a first portion of the training sequence to obtain a first channel estimation for the desired signal component and the interference signal component, and applies the JDV algorithm to a second portion of the training sequence to obtain a second channel estimation for the desired signal component and the interference signal component.

35. The apparatus of claim 34 in which the JDV demodulator applies the JDV algorithm to demodulate the first data field using the first channel estimation as an initial channel estimate, and applies the JDV algorithm to demodulate the second data field using the second channel estimation as an initial channel estimate.

36. An apparatus comprising;
an input module to receive an input signal that includes a desired signal component and an interference signal component, the desired signal component including a training sequence and at least one data field; and
a joint detection Viterbi (JDV) demodulator to
demodulate the training sequence and a corresponding portion of the interference signal component using a joint detection Viterbi (JDV) algorithm to evaluate possible transmitted training sequences and interference signal sequences, and determine channel estimations for the desired signal component and the interference signal component, wherein the JDV demodulator is configured to convolve a channel impulse response with a plurality of known possible transmitted sequences, and
demodulate the at least one data field according to the JDV algorithm using, as initial channel estimates, the channel estimations of the desired signal component and the interference signal component obtained when demodulating the training sequence.

37. The apparatus of claim 36 in which the input signal complies with Global System for Mobile Communications (GSM) standard.

* * * * *